Dec. 4, 1945.  D. M. RICHEY  2,390,173
LOCK FASTENER
Filed Jan. 8, 1945   2 Sheets-Sheet 1
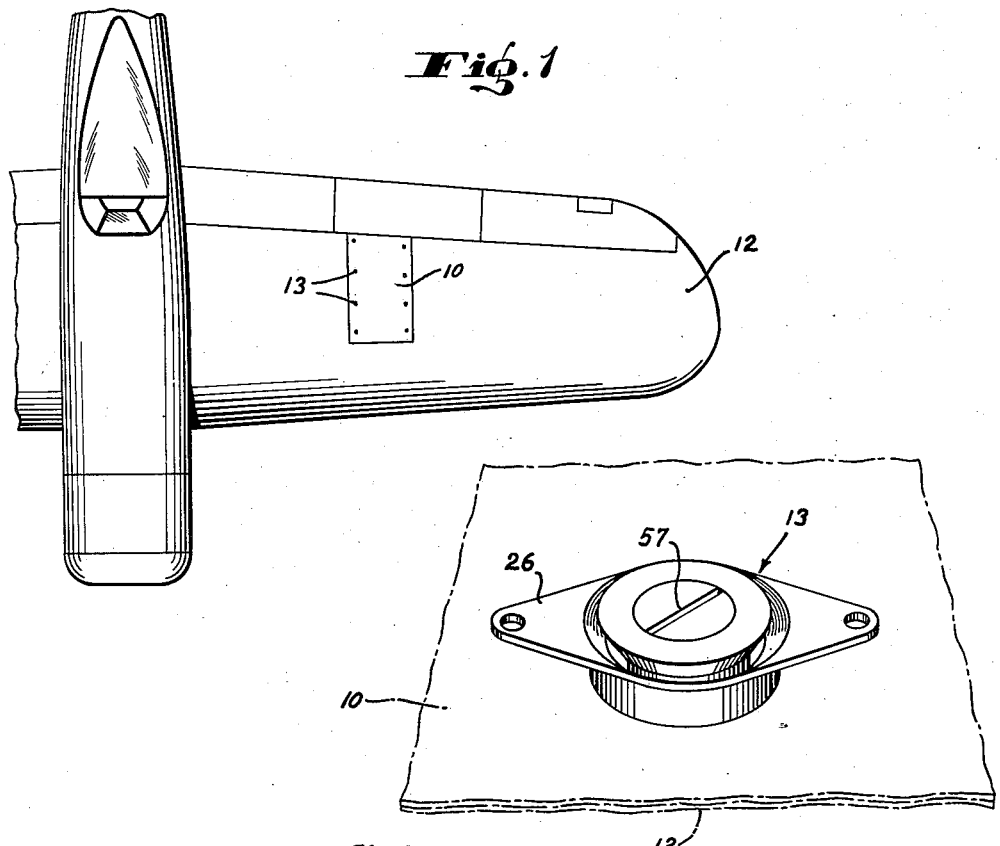
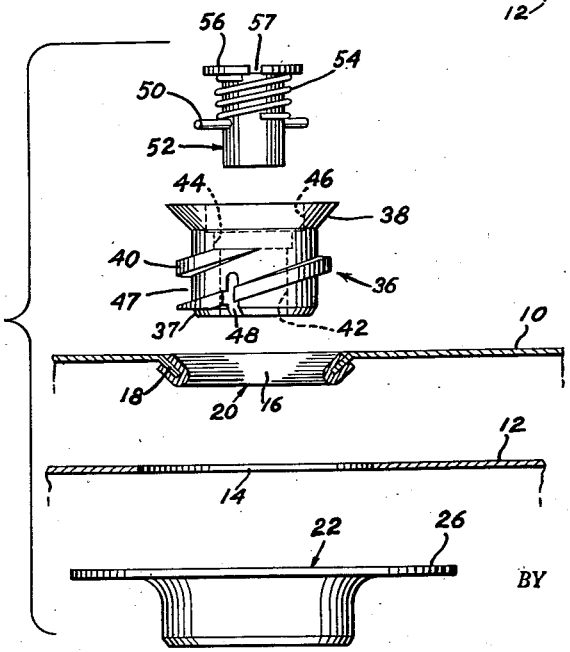
INVENTOR.
David M. Richey
BY
M. B. Tasker
ATTORNEY

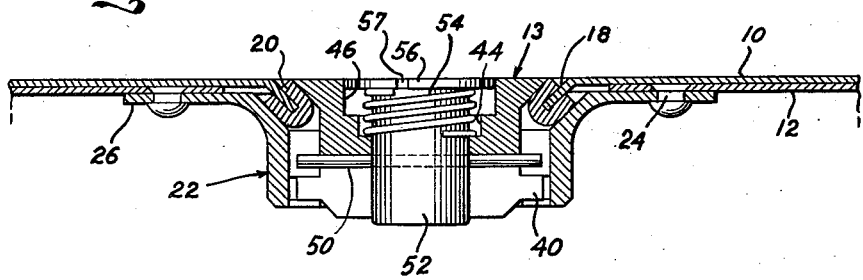
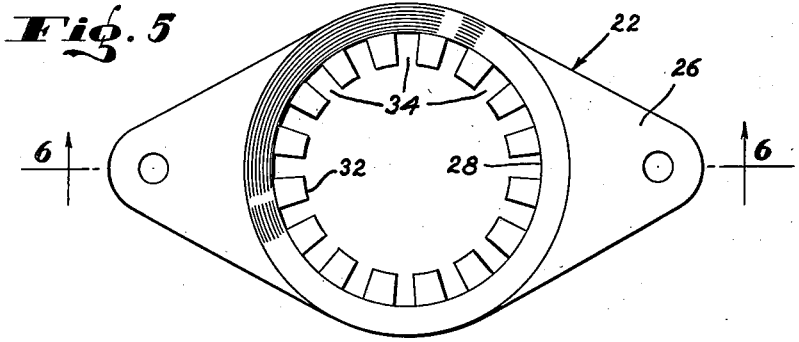
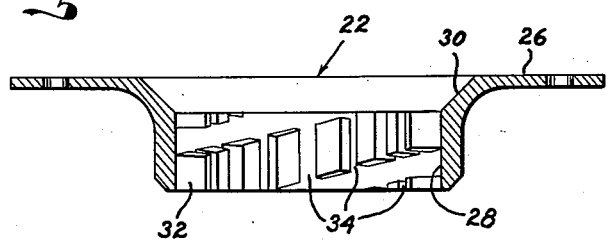
INVENTOR.
David M. Richey

Patented Dec. 4, 1945

2,390,173

UNITED STATES PATENT OFFICE 2,390,173

LOCK FASTENER

David M. Richey, Devon, Conn., assignor to United Aircraft Corporation, East Hartford, Conn., a corporation of Delaware Application January 8, 1945, Serial No. 571,796

7 Claims. (Cl. 151—6)

This invention relates generally to lock fasteners for detachably securing two or more plates or sheet-like parts together.

The fastener of this invention is of the rotary stud type and is particularly adapted for use in detachably securing aircraft cowling, access doors, or the like, to their supporting surfaces on an aircraft, although the invention is not limited to this field of use.

Prior fasteners of this type have depended on spring action to hold the parts in engagement and have provided a predetermined locking position of the rotary element in which the holding spring is stressed. Because of the violent changes in pressure to which the surfaces are subjected in aircraft use and the vibrations frequently present, the surfaces attached by these prior fasteners frequently become separated from their supporting surface and, as the airstream gets under and lifts the surface, the fasteners are not only subjected to destructive stress but the surface drag of the airplane is greatly increased. As a result it has been usual practice to provide a large number of fasteners in an attempt to minimize the above mentioned difficulties.

One object of the present invention is to provide a lock fastener of the rotary stud type in which the rotary element comprises a threaded member having no predetermined locking position but which progressively and positively draws the parts together to provide a flush-tight clamped engagement of the detachable part with its support.

Another object of the invention is to provide a fastener of this general type which is not dependent upon a spring for its holding action and will withstand greatly increased loads over previous known types, thus requiring fewer fasteners for a given installation.

Another object of the invention is to provide a clamp type fastener having improved positive locking means for automatically locking the rotary element in any of a plurality of angularly adjusted positions in which the desired clamping pressure has been obtained.

A further object is generally to improve the construction and operation of fasteners.

In the drawings, which illustrate a preferred embodiment of the invention,

Fig. 1 is a plan view of an airplane including a wing having an access door secured to the wing surface by the improved lock fasteners of my invention, part of the airplane being broken away to facilitate illustration;

Fig. 2 is an assembled view of one of the fasteners, the planes of the access door and the underlying wing surface being indicated in phantom lines;

Fig. 3 is an exploded view of the improved fastener of Fig. 2 and the surfaces to be secured together thereby;

Fig. 4 is a vertical sectional view on an enlarged scale showing a fastener with the parts in locked position;

Fig. 5 is a plan view of the socket member; and

Fig. 6 is a vertical section on line 6—6 of Fig. 5.

Referring to the drawings, the invention is shown for purposes of illustration in connection with an access door 10 secured to the top surface 12 of an airplane wing by a plurality of lock fasteners generally indicated at 13, although it will be evident that the fastener to be described is equally useful for detachably securing airplane cowling or for any other use in which it is desired to connect one or more plate-like members together.

As shown most clearly in Figs. 3 and 4, the wing surface 12 is provided with a plurality of apertures, or openings, 14 spaced about the margin of the access opening which are adapted to register with a plurality of openings 16 along the margins of the access door 10, the annular openings 16 in the door having angularly down-turned flanges 18 which carry grommet members 20 forming countersunk upper surfaces about the openings 16.

An internally threaded socket member 22 is fixed to the under side of wing surface 12 at each opening 14 by rivets 24 which pass through attaching flanges 26 of the socket member and through the wing surface 12, these rivets being of the usual flush type so as to present a smooth upper wing area. As shown most clearly in Figs. 5 and 6, this socket member has an axially threaded bore 28 which is of less diameter than the opening 14 in the wing and is provided at its upper end with an annular outwardly flared stud guiding and door supporting surface 30, against which the grommet member 20 seats when the door 10 is overlying its supporting surface 12. Also as shown in these figures, the axial thread in socket member 28 is a coarse double thread 32 of the square, or Acme, type which is interrupted by a plurality of vertical flutes 34. As shown these flutes are equally spaced at close intervals about the periphery of the threaded passage and extend to the root of the thread, although the flutes may be differently spaced and need not necessarily extend to the full depth of the thread.

A cooperating externally threaded stud member 36, is rotatably supported in the opening 16 of the door with its flat countersunk head 38 resting on the upper inclined surface provided by the grommet 20. The stud 36 is retained from removal from aperture 16 by grommet 20 in which it is normally held loosely by the raised ribs, or teeth, of the threads 40 on the shank portion thereof which terminate somewhat short of the head 38 and provide an annular space to receive the grommet. The threads 40 are adapted to cooperate with threads 32 in the socket member by means of which the door 10 is clamped firmly against the wing surface 12 with the top of the flat head 38 flush with the surface of the door and with the grommet 20 compressed between the under side of the head and surface 30 on the socket member. To facilitate entry of the stud 36 into the threaded passage in the socket member, the lower end of the stud is beveled at 37.

Means are provided for locking the stud member 36 positively against rotation once it has been rotated into a clamping position. To this end, the stud is formed with an axial passage 42 provided with two counterbored portions 44 and 46 adjacent the head end thereof. A diametrical slot 48 is cut in the shank of stud 36 which extends across the thread line of at least one of the ribs of each of the double threads 40 and into the adjacent interrib space 47 to receive a locking pin or detent 50 carried by a plunger 52 reciprocable in the passage 42. Referring to the assembly view of the fastener shown in Fig. 4, it will be evident that the plunger 52 is first inserted in the passage 42 before the pin 50 is inserted in the plunger, a compression spring 54 being located in the recess 44 and bearing at its opposite ends against the annular head 56 of the locking plunger and the bottom of recess 44. It will also be evident that this spring constantly biases the plunger upwardly into a position in which its head 56 is flush with the top surface of the head 38 of the stud. This upward movement of the plunger is limited by the engagement of the rod 50 with the upper end of slot 48. The locking plunger 52 by reason of its interlock with the stud 36 is also made to serve as a stud rotating member and for this purpose has a turning slot 57 formed in its head 56.

In the use of my improved fastener the rotatable assembly including the stud 36 and the locking plunger 52 carried thereby is assembled in the opening formed by grommet 20 with the spring 54 and the pin 50 in place as shown in Fig. 4. The stud may be inserted through the grommet in conventional fashion before the locking plunger is assembled therein or, if desired, the locking plunger may be assembled in the stud with its locking pin 50 in place prior to inserting the stud in the grommet.

With all of the rotatable assemblies in place in the several grommeted openings 16 in the access door, the latter is placed over the access opening in approximate registry with the latter. In this position the beveled ends 37 of the studs, which constitute pilot portions, are centered over the threaded passages 28 in the socket members 22 of corresponding apertures 16 in the wing surface 12. An axial force is exerted on the plunger to depress the same into the bottom of recess 46 by a screwdriver inserted in slot 57. This axial movement of the locking plunger is just sufficient to bring the ends of locking pin 50 into the line of the ribs of the threads 40 which are cut by slot 48 and the projecting ends of the pin 50 become, in effect, a part of the thread on the stud so that in this position of the parts the stud can be rotated to engage its threads 40 with the cooperating threads 32 in the retaining socket member 22. Due to the provision of double threads, with their steep pitch only a relatively small angular movement of the stud is required to clamp the access door firmly against the wing surface.

As the screwdriver is removed from the locking plunger the spring 54 urges this plunger outwardly into the flush position thereof and causes the ends of pin 50 to move into diametrically opposite spaces 34 in the threads 32 thus positively locking the stud against rotation. If in the tightened position of the stud the pin 50 does not register with the spaces 34 but engages the solid position of the thread, a slight forward or backward rotation of the locking plunger may be necessary to effect locking engagement of the pin.

It will be evident that as a result of this invention an improved fastener of the rotary stud type has been provided by which a positive clamping action of the stud is provided without the limitations of a set locking position for the latter. Further it will be evident that improved means has been provided for positively locking the stud in any of a plurality of angular positions of clamping adjustment and that this locking is affected automatically in the use of the fastener. In this connection it should be noted that in the event that through carelessness a fastener is not locked, upon the least movement of the stud in a loosening direction the locking plunger will automatically move into stud locking position.

It will further be evident that a fastener construction has been provided in which the rotatable assembly is retained against accidental displacement in the removable door surface when the latter is detached and which is automatically piloted into fastening position without special attention on the part of the operator during replacement of the door.

It will also be noted that the locking plunger is controlled by a spring which is normally substantially relaxed and is not subjected to stress due to vibration or wind pressure and is not subject to fatigue in service.

It will further be evident that as a result of this invention an improved fastener of this type has been provided which is very reliable and hence is especially adapted to aircraft uses.

While I have described one embodiment of my invention herein it will be evident that various changes may be made in the construction illustrated without departing from the spirit of the invention or the scope of the following claims.

I claim:

1. In combination, two members provided with registering openings, and means for detachably connecting said members comprising, a stationary fastening element carried by one member, a cooperating rotatable fastening element carried by said other member, said fastening elements having cooperating threads for drawing said members positively together in a progressive manner as said rotatable element is rotated, and locking means including a locking member which is mechanically independent of the cooperating threads on said members and is carried by one of said elements and engages an abutment on the other of said elements for positively locking said rotatable element in any of a plurality of positions of angular relationship thereof relative to said stationary fastening element, said locking member comprising a laterally projecting detent movable across a rib of the thread on the element by which it is carried and said abutment comprising an interrupted rib of the thread on said other element.

2. In combination, two members to be connected provided with registering openings, and means for detachably connecting said members including, a stationary fastening element carried by one of said members comprising an internally threaded socket having a plurality of discontinuous thread portions, a cooperating fastening element carried by the other element comprising an externally threaded stud, means for rotating said stud to draw said members positively together in a progressive manner by means of said threads including a plunger carried by and reciprocable axially of said stud, means comprising a shoulder on said plunger for limiting the axial movement of said plunger in one direction, means comprising a lateral locking projection on said plunger movable in an axial slot in said stud for limiting the axial movement of said plunger in the other direction to a position in which one end thereof is flush with the exposed surface of said supported member, said projection being disposed in one limit of movement of said plunger in the line of a rib of the thread on said stud and in the other limit of movement being disposed between adjacent discontinuous thread portions on said socket.

3. In combination, supporting and supported members having registering apertures therein, means for clamping said members forcibly together including an externally threaded stud rotatably mounted in the aperture of said supported member and an internally threaded socket secured to said supporting member in registry with said stud, said stud and socket having axial slots extending across adjacent threads thereon and registering in one relative angular position of said members, and locking means carried by said stud and movable longitudinally thereof including a spring pressed transverse member normally disposed in the rib of the slotted thread on said stud during screw engagement of said stud and threaded socket and automatically movable into the slot in the adjacent rib on said socket member to lock said stud positively against rotation relative to said socket.

4. In combination, two members provided with registering openings, and means for detachably connecting said members comprising, an internally threaded socket fixed to one member having a plurality of discontinuous thread portions, an externally threaded stud rotatably supported on the other member, said stud having an axial plunger passage and a radial slot communicating with said passage which extends axially across a thread rib thereon and terminates in the inter-rib space above said rib, a locking plunger axially reciprocable in said stud having a head movable from a position in which it is flush with the exposed surface of said stud supporting member into engagement with the bottom of a recess in said stud, said locking plunger having a laterally projecting locking pin extending through said radial slot, said pin occupying a position in the line of the thread rib on said stud when said plunger is depressed into engagement with the bottom of said recess and occupying a stud locking position between adjacent thread portions of the thread on said socket in the flush position of said plunger, and resilient means for constantly biasing said plunger into said locking position.

5. In a rotary stud type fastener, a socket member having relatively coarse threads, a stud having cooperating threads, the ribs of the threads on said socket member being interrupted to provide a plurality of flutes extending across the threads thereof at peripherally spaced points, means cooperating with said flutes for locking said stud in any one of a plurality of angular positions of rotation including a locking plunger reciprocable in the axis of said stud having a diametrical locking pin projecting into the threaded periphery of said stud and reciprocable across ribs of the threads thereon at diametrically opposite points, and means for urging said plunger axially into a position in which said pin is in the ribs of the threads on said socket member.

6. In a rotary stud type fastener, a socket member having a coarse axial thread, a rotatable stud member having a cooperating thread, the ribs of the thread on said socket member being mutilated to provide a plurality of parallel flutes extending across said ribs at peripherally spaced points about said socket, and said stud having a radial slot extending longitudinally thereof across a single thread rib and terminating in an adjacent inter-rib space, said stud also having an axial passage communicating with said slot, a plunger axially reciprocable in said stud, a locking detent carried by said plunger and extending laterally into said slot, said detent having a dimension along the axis of said stud which does not exceed the axial dimension of a single thread rib thereon, stop means for limiting the movement of said plunger in one direction of movement in a position in which said detent lies in the line of the interrupted thread rib on said stud, and means constantly biasing said plunger in the opposite direction to move said detent against the end of said slot and into a flute in said socket member for locking said members against relative angular movements.

7. In a rotary stud type fastener, a socket member having a coarse thread which is mutilated to form longitudinal flutes at spaced points about the periphery thereof, a rotatable stud having a cooperating thread, said stud having an axial passage provided with an upper enlarged recess and a diametrical slot at its lower end, a plunger reciprocable in said passage having a turning head adapted to be depressed into said recess, a locking pin carried by said plunger and extending laterally in said slot beyond said stud into the inter-rib spaces of the threads on said socket member, the ends of said pin being disposed in the line of a thread rib on said stud when said plunger is depressed into said recess whereby the ends of the pin become a part of the stud thread and said stud can be rotated into said socket, and being disposed in locking position in diametrically opposite flutes in the threads of said socket member when the head of said plunger is flush with the end of said stud, and a spring in said recess for biasing said plunger into the locking position of said pin.

DAVID M. RICHEY.